(12) United States Patent  
Chow et al.

(10) Patent No.: US 11,783,835 B2  
(45) Date of Patent: Oct. 10, 2023

(54) SYSTEMS AND METHODS FOR UTILIZING CONTEXTUAL INFORMATION OF HUMAN SPEECH TO GENERATE SEARCH PARAMETERS

(71) Applicant: Capital One Services, LLC, McLean, VA (US)

(72) Inventors: Chih-Hsiang Chow, Plano, TX (US); Steven Dang, Plano, TX (US); Elizabeth Furlan, Plano, TX (US)

(73) Assignee: Capital One Services, LLC, McLean, VA (US)

( * ) Notice: Subject to any disclaimer, the term of this patent is extended or adjusted under 35 U.S.C. 154(b) by 504 days.

(21) Appl. No.: 16/863,832

(22) Filed: Apr. 30, 2020

(65) Prior Publication Data

US 2021/0343289 A1 Nov. 4, 2021

(51) Int. Cl.
*G10L 15/26* (2006.01)
*G10L 15/18* (2013.01)
(Continued)

(52) U.S. Cl.
CPC .............. *G10L 15/26* (2013.01); *G10L 15/08* (2013.01); *G10L 15/1815* (2013.01); *G10L 25/90* (2013.01); *G10L 2015/088* (2013.01)

(58) Field of Classification Search
CPC ..... G10L 15/26; G10L 15/08; G10L 15/1815; G10L 25/90; G10L 2015/088;
(Continued)

(56) References Cited

U.S. PATENT DOCUMENTS 6,647,383 B1  11/2003  August et al.
9,076,175 B2   7/2015  Ramer et al.
(Continued)

OTHER PUBLICATIONS

Karthik et. al, "A Recommendation System for Online Purchase Using Feature and Product Ranking", Aug. 2-4, 2018, 2018 Eleventh International Conference on Contemporary Computing (IC3) (Year: 2018).*

(Continued)

*Primary Examiner* — Vijay B Chawan
(74) *Attorney, Agent, or Firm* — Bookoff McAndrews, PLLC

(57) ABSTRACT

A computer-implemented method for providing product recommendations to a user may include receiving audio data from a user device. The audio data may include human speech from a user associated with the user device. The method may further include: performing a speech-to-text process on the audio data to determine text; segmenting the text into discrete conceptual units; identifying keywords that correspond words in the text; associating keywords with the conceptual units having the corresponding words; performing a first analysis process on the conceptual units to determine a first score; performing a second analysis process portions of the human speech correlated with the conceptual units to determine a second score; determining a keyword score for each keyword based on the first and second scores of the conceptual units; determining a product recommendation based on the keywords associated with conceptual units and the corresponding keyword scores; and causing the user device to output the recommendation.

16 Claims, 4 Drawing Sheets

(51) Int. Cl.
*G10L 15/08* (2006.01)
*G10L 25/90* (2013.01)

(58) Field of Classification Search
CPC ..... G10L 13/04; G10L 25/51; G06Q 30/0256; G16H 50/20; G06F 16/9577; G06N 20/00; H04N 21/4532
See application file for complete search history.

(56) References Cited

U.S. PATENT DOCUMENTS

| | | | | |
|---|---|---|---|---|
| 10,096,319 | B1* | 10/2018 | Jin | G10L 25/51 |
| 10,593,350 | B2* | 3/2020 | Liu | G10L 15/26 |
| 11,416,907 | B2* | 8/2022 | Catalano | G06Q 30/0201 |
| 2010/0042469 | A1* | 2/2010 | Chandrasekar | G06Q 30/0256 |
| | | | | 705/14.1 |
| 2010/0094878 | A1* | 4/2010 | Soroca | G06F 16/9577 |
| | | | | 707/812 |
| 2015/0293917 | A1* | 10/2015 | Bufe, III | G06F 16/24575 |
| | | | | 706/12 |
| 2017/0140757 | A1 | 5/2017 | Penilla et al. | |
| 2017/0242920 | A1* | 8/2017 | Neland | G06N 20/00 |
| 2018/0053235 | A1* | 2/2018 | Catalano | G06Q 30/0201 |
| 2018/0082389 | A1* | 3/2018 | Guggilla | G06N 20/00 |
| 2018/0213284 | A1* | 7/2018 | Shekhar | G06F 17/30867 |
| 2019/0026436 | A1 | 1/2019 | Bender et al. | |
| 2019/0164554 | A1* | 5/2019 | Huang | G06F 16/685 |
| 2019/0180871 | A1* | 6/2019 | Doerflinger | G16H 50/20 |
| 2020/0020328 | A1* | 1/2020 | Gordon | G06F 21/6245 |

OTHER PUBLICATIONS

Cambria, "Affective Computing and Sentiment Analysis", Mar. 17, 2016, IEEE Intelligent Systems, vol. 31 Issue: 2, 102-107 (Year: 2016).*

* cited by examiner

SYSTEMS AND METHODS FOR UTILIZING CONTEXTUAL INFORMATION OF HUMAN SPEECH TO GENERATE SEARCH PARAMETERS

TECHNICAL FIELD

Various embodiments of the present disclosure relate generally to using human speech to generate search parameters, and relate particularly to methods and systems for using voice recognition and/or machine learning to determine contextual information for human speech that is usable to generate search parameters.

BACKGROUND

A multitude of available options for a product can make it difficult for a customer to make a selection. For example, from amongst all of the possible options for purchasing a vehicle, it can be difficult for a customer to determine which option is best suited to their needs. To address this difficulty, vendors typically attempt to narrow down the field of available products by having the customer set one or more parameters for the product. For a vehicle, such parameters may include make, model, size, color, year, etc. However, many customers may not have considered their product needs in terms of such parameters, and thus there may be a disconnect between the way the customer would describe their needs and the options provided by the available parameters. Requiring the customer to set parameters in order to find a suitable product may not only cause the customer to disengage from the search for a product, but also may miss nuances in the customer's needs.

The present disclosure is directed to addressing one or more of these above-referenced challenges. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY

According to certain aspects of the disclosure, methods, systems, and non-transitory computer-readable media are disclosed for determining contextual information for human speech and generating one or more product recommendations based on the contextual information. Each of the examples disclosed herein may include one or more of the features described in connection with any of the other disclosed examples.

In one example, a computer-implemented method may include: receiving audio data from a user device, the audio data including human speech from a user associated with the user device; performing a speech-to-text process on the received audio data to determine text corresponding to, and correlated with, the human speech in the received audio data; segmenting the text into one or more discrete conceptual units, such that a respective portion of the human speech is correlated with each of the one or more conceptual units; identifying one or more keywords in the predetermined list of keywords that correspond to one or more words in the text, and associating each identified keyword with one or more of the conceptual units having the corresponding one or more words; performing a first analysis process on each of the one or more conceptual units to determine a respective first score of each of the one or more conceptual units; performing a second analysis process on the respective portion of the human speech correlated with each of the one or more conceptual units to determine a respective second score of each of the one or more conceptual units; for each keyword in the predetermined list of keywords that is associated with one or more of the one or more conceptual units, determining a keyword score based on the respective first score and the respective second score of the one or more conceptual units; determining at least one product recommendation based on the one or more keywords associated with one or more of the one or more conceptual units and the corresponding keyword score; and causing the user device to output the at least one product recommendation.

In another example, a computer-implemented method may include: generating search keyword data for a search related to a product, by: causing a user device associated with a user to output at least one prompt for a description of a product, wherein each of the at least one prompt is associated with a respective category of keywords in a predetermined list of keywords associated with the product; receiving audio data from the user device, the audio data including human speech from the user; performing a speech-to-text process on the received audio data to determine text corresponding to, and correlated with, the human speech in the received audio data; segmenting the text into one or more discrete conceptual units, such that a respective portion of the human speech is correlated with each of the one or more conceptual units; and identifying one or more keywords in the predetermined list of keywords that correspond to one or more words in the text, and associating each identified keyword with one or more of the conceptual units having the corresponding one or more words; determining, based on the identifying, for each category of keywords, whether the category of keywords consists of keywords unassociated with any of the conceptual units and, in response to the determining, repeating the generating of search keyword data using at least one prompt associated with the category of keywords consisting of keywords unassociated with any of the conceptual units; performing a first analysis process on each of the one or more conceptual units to determine a respective first score of each of the one or more conceptual units; performing a second analysis process on the respective portion of the human speech correlated with each of the one or more conceptual units to determine a respective second score of each of the one or more conceptual units; for each keyword in the predetermined list of keywords that is associated with one or more of the one or more conceptual units, determining a keyword score based on the respective first score and the respective second score of the one or more conceptual units; determining at least one product recommendation based on the one or more keywords associated with one or more of the one or more conceptual units and the corresponding keyword score; and causing the user device to output the at least one product recommendation.

In a further example, a system may include: a memory storing instructions; and at least one processor executing the instructions to perform a process. The process may include: causing a user device associated with a user to output a prompt for a description of a product; receiving audio data from the user device, the audio data including human speech from the user; performing a speech-to-text process on the received audio data to determine text corresponding to, and correlated with, the human speech in the received audio data; segmenting the text into one or more discrete conceptual units, such that a respective portion of the human speech is correlated with each of the one or more conceptual units;

identifying, from a predetermined list of keywords associated with the product, keywords that correspond to one or more words in the one or more conceptual units, and associating the identified keywords with the one or more conceptual units having the corresponding words; performing a sentiment analysis process on each of the one or more conceptual units to determine a respective sentiment score of each of the one or more conceptual units; performing an emphasis analysis process on the respective portion of the human speech correlated with each of the one or more conceptual units to determine a respective emphasis score of each of the one or more conceptual units; for each keyword in the predetermined list of keywords that is associated with one or more of the one or more conceptual units, determining a keyword score based on the respective sentiment score and the respective emphasis score of the one or more conceptual units; determining at least one product recommendation based on the one or more keywords associated with one or more of the one or more conceptual units and the corresponding keyword score; and causing the user device to output the at least one product recommendation.

Additional objects and advantages of the disclosed embodiments will be set forth in part in the description that follows, and in part will be apparent from the description, or may be learned by practice of the disclosed embodiments.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Figure 1:
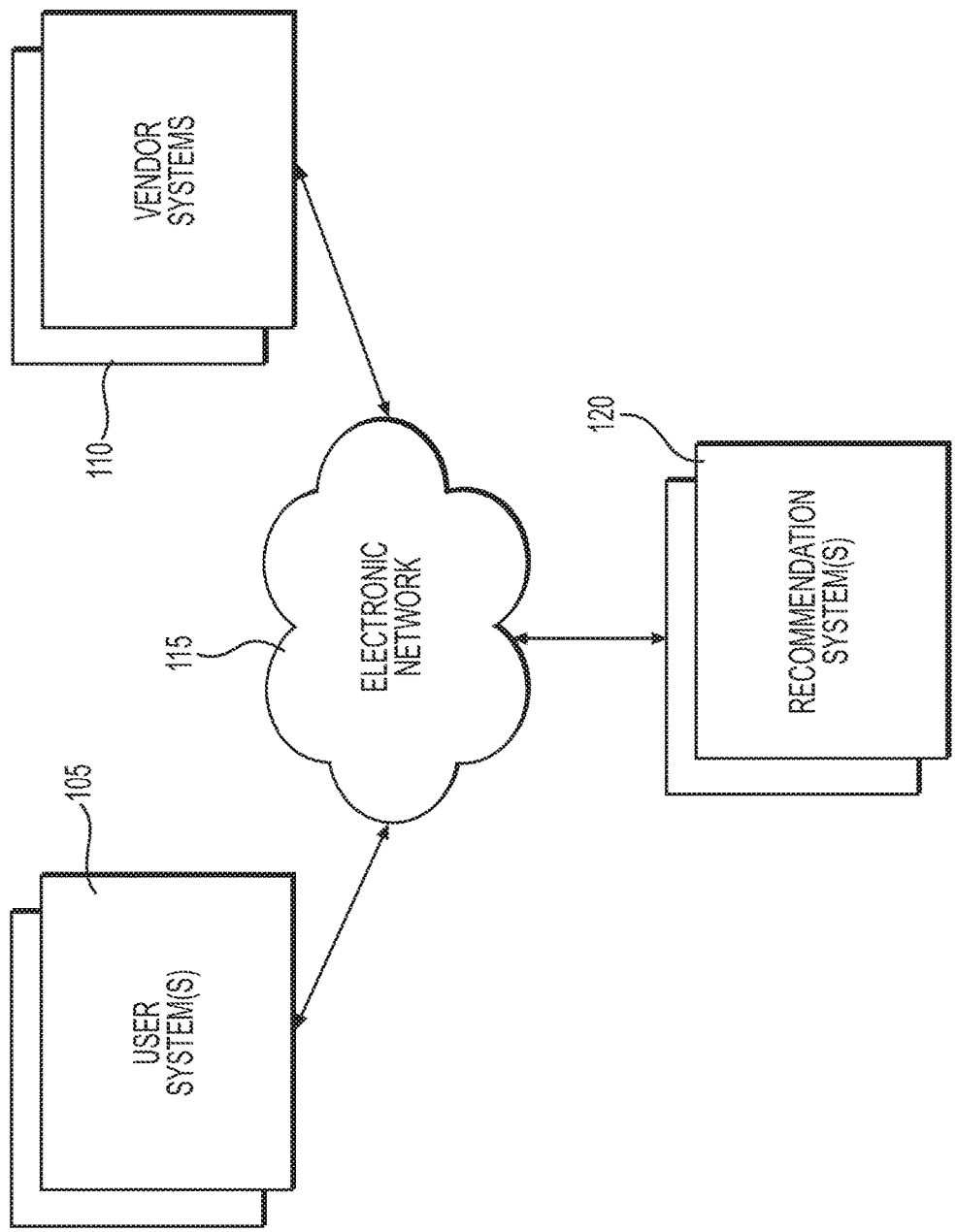
FIG. 1 depicts an exemplary client-server environment that may be utilized according to aspects of the present disclosure.

The terminology used in this disclosure is to be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "computer system" generally encompasses any device or combination of devices, each device having at least one processor that executes instructions from a memory medium. Additionally, a computer system may be included as a part of another computer system.

In this disclosure, the term "based on" means "based at least in part on." The singular forms "a," "an," and "the" include plural referents unless the context dictates otherwise. The term "exemplary" is used in the sense of "example" rather than "ideal." The term "or" is meant to be inclusive and means either, any, several, or all of the listed items. The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. Relative terms, such as, "substantially," "approximately," "about," and "generally," are used to indicate a possible variation of ±10% of a stated or understood value.

As used herein, the term "dealer" may indicate, and may be used interchangeably with, a seller of items or services, a vendor of items or services, etc. The term "client" may indicate, and may be used interchangeably with, a customer, buyer, person attempting to obtain a lease, ownership, ownership share, etc., of an item and/or service. The term "user" may indicate, and may be used interchangeably with a customer, or a vendor acting as an intermediary for the customer.

In general, the present disclosure provides methods and systems for using voice recognition and machine learning to determine contextual information of human speech, and for utilizing such contextual information to generate search parameters for making a product recommendation based on the human speech. As will be discussed below in more detail, in methods and systems according to the present disclosure, existing techniques may be improved.

Generally, a customer searching for a product to purchase may request a recommendation from a vendor. For many transactions, this request may take the form of an automated search. In one example, a customer may enter a query corresponding to a product into a search field on an e-commerce website, e.g. "car," "television," "radio," etc. In another example, a customer or a salesman enters a query into an inventory system, database, or the like. In some instances, an automated search is designed to return results that are determined to be relevant to the query, e.g. via keyword analysis or other criteria. However, in instances where many options for a product are available, the number of results returned by such a search may be overwhelming to the customer, and hinder the customer's ability to make a choice.

In some instances, an automated search is designed to limit the results returned by the search based on one or more parameters. For example, an automated search for a television may enable a search to be limited by size, resolution, price, etc., and thus may provide a more limited scope of results to the customer that may be easier for the customer to parse and use to make a selection.

However, a customer may not have considered their product needs in terms of such parameters, and thus there may be a disconnect between the way the customer would describe their needs and the options provided by the available parameters. For example, in conversation, a customer might describe their needs for a television as "good for watching movies, and something that will work with my sound system." The customer and/or a salesman acting as an intermediary, however, may not have a clear understanding as to how that desire translates into the parameters for a television available on the automated search.

This misalignment between how a customer views their product needs and how a product is parameterized may present a barrier to entry for the customer that causes them to disengage from or delay their search for the product. Such a misalignment may also result in the customer's product needs not being accurately represented by the available parameters. Accordingly, a need exists to improve the alignment between a customer's product needs and the way in which product recommendations are returned in an automated search.

Human conversation includes more than the textual content of the speech. For example, a conversation between humans includes contextual information such as sentiment, tone, volume, inflection, pace, physical gestures, etc., that provide information in addition to the words spoken in the conversation. Identifying such contextual information, and relating such contextual information to the parameterization of a product, may improve the identification of the customer's product needs, an accuracy of search parameters generated for a recommendation, and the quality of the recommendation provided to the customer. The ability for a customer to interact naturally when seeking a product recommendation, rather than having to set one or more parameters, may also lower the barrier for entry for a customer seeking a product recommendation. Thus, a need exists for systems and methods for using voice recognition and/or machine learning to determine contextual information for human speech that is usable to generate search parameters for making product recommendations.

FIG. 1 depicts an exemplary client-server environment that may be utilized with techniques presented herein. One or more user system(s) 105 and/or one or more vendor system(s) 110 may communicate across an electronic network 115. The systems of FIG. 1 may communicate in any arrangement.

The user system 105 may be associated with a user, e.g. a customer seeking to find a product for purchase. In some embodiments, the user system 105 is incorporated into a vendor system 110. For example, a vendor using a vendor system 110 may be acting as an intermediary for a customer during a consultation for a purchase. The user system 105 includes an audio receiver component, e.g. a microphone or the like, that is configured to capture human speech as audio data. The vendor system 110 may include one or more of an e-commerce platform, an inventory system, a database with product information, or the like.

As will be discussed herein, one or more recommendation system(s) 120 may communicate with the user system 105 and/or vendor system 110 over the electronic network 115 in executing a machine learning model to identify contextual information associated with human speech, to generate search parameters for products based on such contextual information, and/or to determine product recommendations based on such search parameters. As used herein, a "machine learning model" may include data (e.g., human speech data, product data, historical customer data, or vendor data) or instruction(s) for generating, retrieving, and/or analyzing such data.

In various embodiments, the electronic network 115 may be a wide area network ("WAN"), a local area network ("LAN"), personal area network ("PAN"), or the like. In some embodiments, electronic network 115 includes the Internet, and information and data provided between various systems occurs online. "Online" may mean connecting to or accessing source data or information from a location remote from other devices or networks coupled to the Internet. Alternatively, "online" may refer to connecting or accessing an electronic network (wired or wireless) via a mobile communications network or device. The Internet is a worldwide system of computer networks—a network of networks in which a party at one computer or other device connected to the network can obtain information from any other computer and communicate with parties of other computers or devices. The most widely used part of the Internet is the World Wide Web (often-abbreviated "WWW" or called "the Web").

While FIG. 1 depicts the various systems as physically separate and communicating across the electronic network 115, in various embodiments features of certain systems, such as the recommendation system 120, may be incorporated partially or completely into any of the other systems of FIG. 1. For example, a portion of the machine learning model may be incorporated into vendor system 110 and/or the user system 105. Some or all of the functionality of the recommendation system 120 may be incorporated into user system 105. For example, some or all of the functionality of the recommendation system 120 may be incorporated into an internet browser extension or website page usable by a customer, such as via user system 105 or via a vendor system 110 or other system accessible by the customer.

Figure 2:
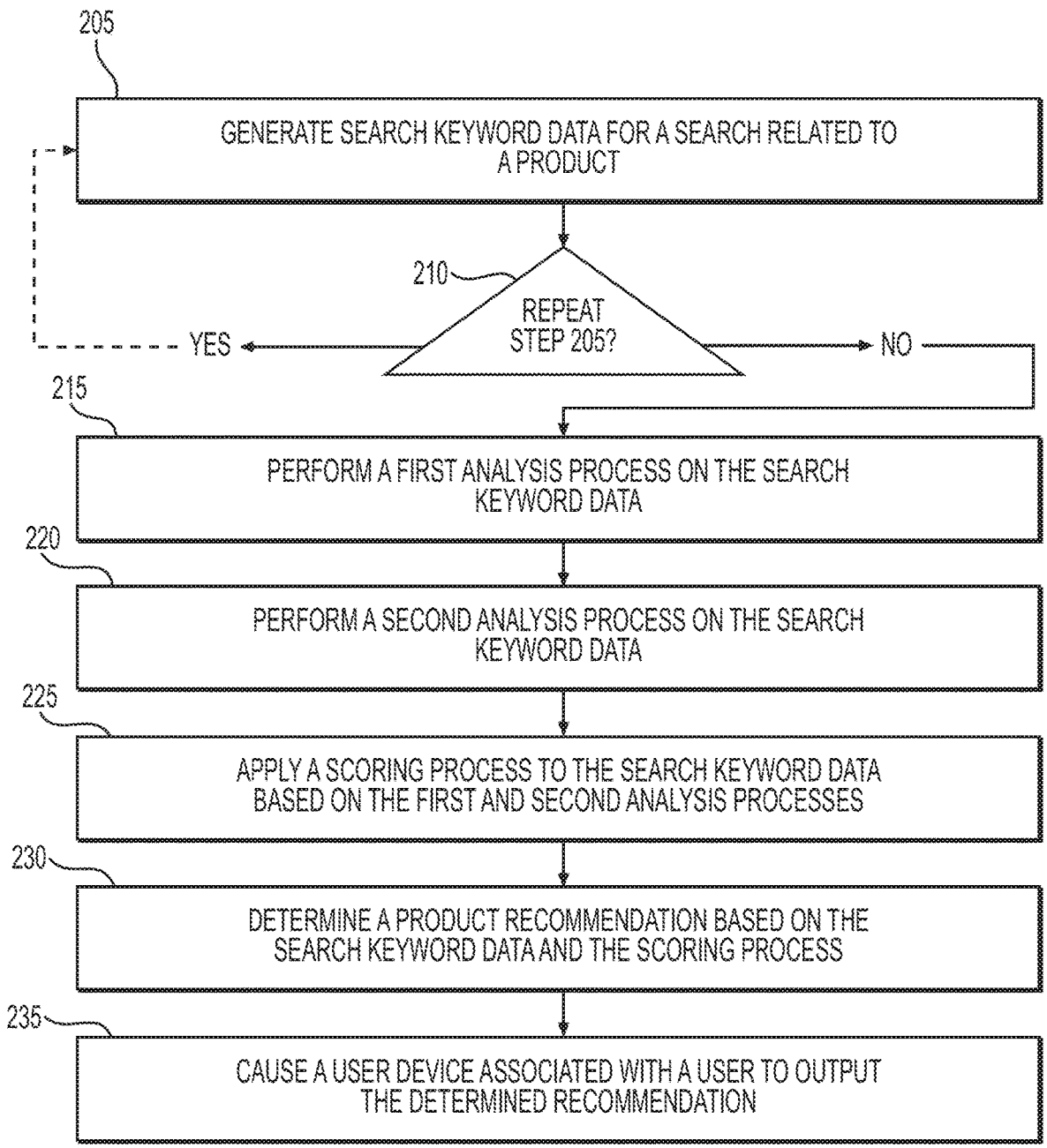
FIG. 2 depicts an exemplary process for providing recommendations for a product to a user.

FIG. 2 illustrates an exemplary process for providing recommendations for a product to a user. At step 205, the recommendation system 120 may generate search keyword data for a search related to the product. At step 210, the recommendation system 120 may optionally repeat the generation of search keyword data. At step 215, the recommendation system 120 may perform a first analysis process on the search keyword data. At step 220, the recommendation system 120 may perform a second analysis process on the search keyword data. At step 225, the recommendation system 120 may apply a scoring process to the search keyword data based on the first and second analysis processes. At step 230, the recommendation system 120 may determine a product recommendation based on the search keyword data and the scoring process. At step 235, the recommendation system 120 may cause a user device associated with the user (e.g., user system 105) to output the determined recommendation. Each of the steps from the foregoing process are discussed in further detail below.

Figure 3:
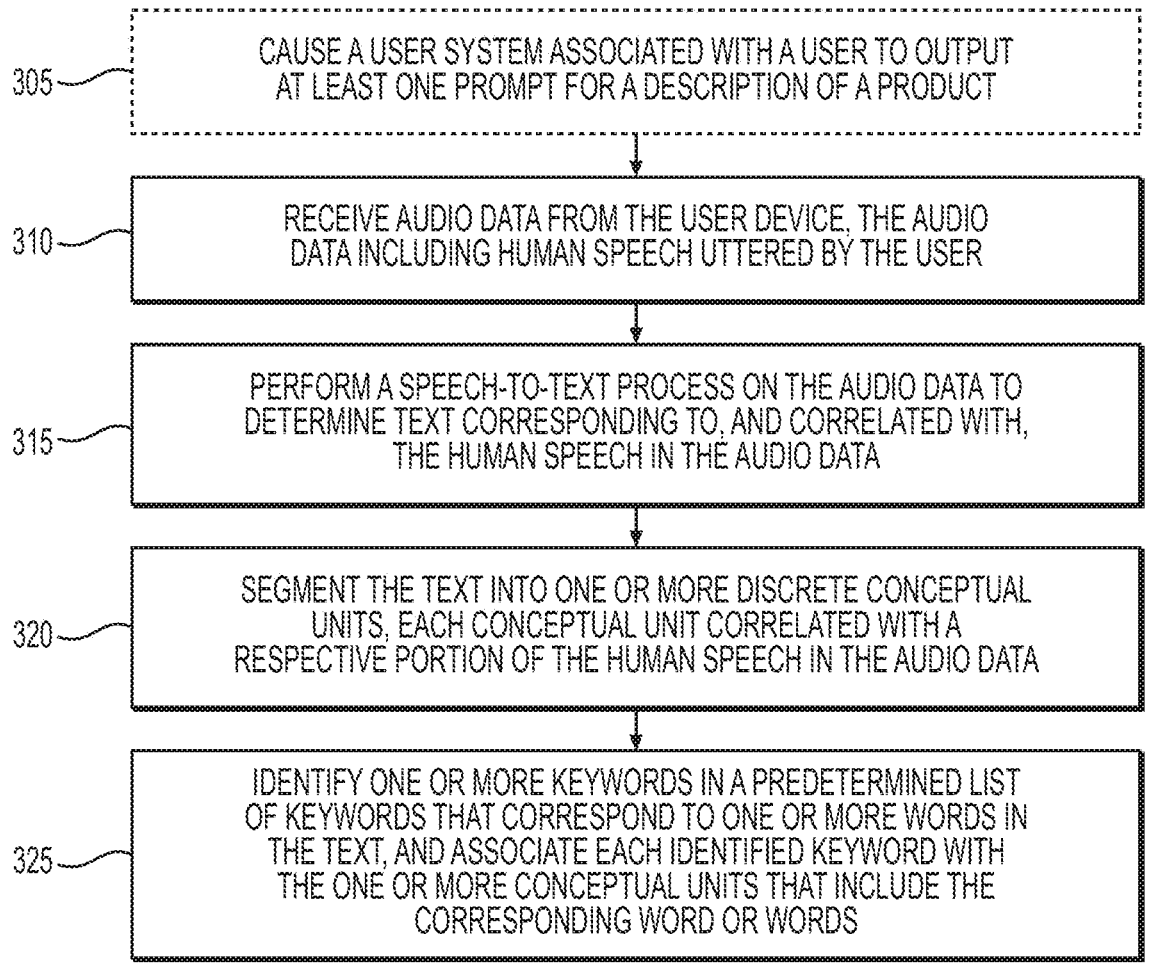
FIG. 3 depicts an exemplary process for generating search keyword data from the process of FIG. 2.

FIG. 3 illustrates an exemplary process for generating search keyword data (step 205 from FIG. 2).

Optionally, at step 305, the recommendation system 120 may cause a user system 105 associated with the user to output at least one prompt for a description of the product. In an example for a vehicle, the recommendation system 120 may cause the user system 105 to prompt the user with one or more phrases such as "what kind of car do you want?", "what color?", "what is your preferred price range," or the like. In some embodiments, the prompt includes generation of an audio signal having prerecorded and/or synthesized human speech. In some embodiments, the prompt includes written text outputted via a visual interface on the user system 105. In some embodiments, there is no prompt.

In some embodiments, the at least one prompt is predetermined. For example, in some embodiments, the recommendation system 120 may include a set of predetermined prompts, and select at least one prompt from the set, e.g., based on a predetermined sequence and/or based on a determination that no keywords from a particular category of keywords has been received by the recommendation system 120, as discussed in further detail below. In some embodiments, the recommendation system 120 employs a machine learning model or algorithm to generate prompts based on, for example, one or more of keywords or categories of keywords, previously generated search keyword data, or information associated with the user such as search history data, profile data, social information data, or the like.

The machine learning model of the recommendation system 120 may include product data that has a predetermined list of keywords associated with the product. As an example, keywords associated with a product may include or be associated with possible parameters for the product, descriptors of the product, or the like. In some embodiments, the predetermined list of keywords associated with a product is separated into one or more categories. For example, for a vehicle, keywords "red," "green," "blue," and the like may be part of a "color" category, and keywords "car," "truck," "SUV," and the like may be part of a "type" category. In some embodiments, one or more of the at least one prompt outputted in step 305 is associated with a respective category of keywords in the predetermined list. For example, the prompt of "what color?" may be associated with the "color" category of keywords that includes "red," "green," "blue," and the like. Associating one or more of the at least one prompts with a respective category may increase a likelihood that the user will address an aspect of the product related to the respective category when responding to the prompt.

At step 310, the recommendation system 120 may receive audio data from the user device 105, whereby the audio data includes human speech uttered by the user. Any acceptable format for the audio data may be used, such as WAV, MP3, etc. In some embodiments, the audio data is received as a stream. In some embodiments, the audio file includes a plurality of separate audio recordings, for example one for each prompt. In some embodiments, the audio data includes a single, continuous audio recording.

At step 315, the recommendation system 120 may perform a speech-to-text process on the received audio data to determine text corresponding to, and correlated with, the human speech in the received audio data. In some embodiments, the determined text is associated with a time-stamp in the audio data. In some embodiments, a particular portion of the audio data is extracted or identified as corresponding to a particular portion of the text. Any acceptable speech-to-text process may be used, and any acceptable process for correlating the determined text with the human speech in the audio data may be used. In some embodiments, a machine-learning speech-to-text model is used that is trained using previously received audio data that includes the user's speech. In some embodiments, a machine-learning speech-to-text model is used that is not specifically associated with the user.

At step 320, the recommendation system 120 may segment the determined text into one or more discrete conceptual units, such that a respective portion of the human speech from the user in the audio data is correlated with each of the one or more conceptual units. As used herein, the term "discrete conceptual unit" means a word or words in a portion of text or speech that pertains to a single idea or concept, as opposed to a phrase or sentence that may conflate various concepts and ideas. For example, when searching for a vehicle, the user's speech may include the following: "I want a fast car, maybe in red, and with a kick'n sound system!" The recommendation system 120 may separate that speech into discrete conceptual units including "I want a fast", "car", "maybe in red", and "and with a kick'n sound system!" Each of the foregoing units only includes a single concept, e.g. the type of vehicle, speed capability, color, and included accessories. In other words, the text is segmented such that each segmented unit does not overlap in subject matter. It should be understood that the foregoing is an example only, and that in some embodiments, words or phrases, such as articles, transitions, adjectives, etc., and the like may appear in multiple discrete conceptual units so long as each unit is directed to a different subject than each other.

In some embodiments, the segmentation of the text into the one or more conceptual units is based on one or more aspects of the words in the text or one or more aspects of the corresponding human speech in the audio data. For example, in some embodiments, the text is segmented based on parts of speech in the text. In some embodiments, the text is segmented based on pauses between portions of human speech in the audio data, between changes in inflection, tone, pitch, or speed in the user's voice, or other vocal aspects of the human speech. In some embodiments, the recommendation system 120 and/or another system in communication with the recommendation system 120 performs a part of speech and/or punctuation analysis on the text from the speech-to-text process, and then segments the text based on the foregoing analysis. Any acceptable criteria is usable to segment the text into discrete conceptual units.

At step 325, the recommendation system 120 may identify one or more keywords, in the predetermined list of keywords associated with the product stored by the machine learning model, that correspond to one or more words in the text. For example, the user's speech may include the following: "I want a red car with a fast engine. It has to be red. Like . . . fire engine red!" The recommendation system 120 may identify that the keyword "red" corresponds to the words, "red", "red", and "fire engine red!", that the keyword "car" corresponds to the word "car", and that the keyword "high performance" corresponds to the words "fast engine".

Also in step 325, each identified keyword is associated with the one or more conceptual units that include the corresponding word or words. For example, the recommendation system may have segmented the foregoing speech into the following conceptual units: 1—"I want a red", 2—"car", 3—"with a fast engine", 4—"It has to be red", and 5—"Like . . . fire engine red!" The recommendation engine 120 may then associate conceptual units 1, 4, and 5 with the keyword "red", conceptual unit 2 with the keyword "car", and conceptual unit 3 with the keyword "high performance". In this manner, search keyword data is generated such that a keyword is not only associated with a corresponding word, but also with other surrounding words and the corresponding audio data that provide contextual information for the corresponding word. Table 1, below, is an illustrative example of how the foregoing speech may be expressed as search keyword data. It should be understood that Table 1 below is an example only, and that any acceptable schema for representing search keyword data may be used.

TABLE 1

Example of Search Keyword Data

| Keyword | Category | Conceptual Unit(s) - Portion of Audio Data |
| --- | --- | --- |
| red | color | 1-"I want a red" - 0:01 to 0:02<br>4-"It has to be red" - 0:03 to 0:04<br>5-"Like . . . fire engine red" - 0:04 to 0:06 |
| car | vehicle type | 2-"car" - 0:02 to 0:02 |
| high performance | vehicle performance | 3-"with a fast engine" - :0:02 to 0:03 |

In the table above, each keyword is associated with one or more conceptual units, which are correlated with time portions of the human speech in the audio data.

With reference again to FIG. 2, as mentioned above, at step 210, the generation of search keyword data is optionally repeated. As also noted above, in some embodiments, the predetermined list of keywords associated with the product is separated into categories. In some embodiments, after completion of step 205, the recommendation system 120 may determine, based on the identified keywords (e.g., at step 325 in FIG. 3), whether there are any categories of keywords consisting of keywords not corresponding to any of the words in the determined text.

For example, the user's speech may not include any words like "blue", "green", "red", or the like, and the recommendation system 120 may determine that no keywords in the category of "color" were associated with any words in the text determined from the user's speech. Based on such a determination, the recommendation system 120 may repeat step 205 for that category of keywords. In some embodiments, the recommendation system repeats step 205 using a particular prompt (step 305 of FIG. 3) that is associated with that category.

Once the search keyword data is generated, the recommendation system 120 may perform one or more analysis processes on the search keyword data. While the embodiment depicted in FIG. 2 includes a first process and a second process (steps 215 and 220, respectively), it should be understood that in various embodiments, a single process may analyze multiple dimensions, or additional processes may be performed. The multiple processes may include, for example, a sentiment analysis process, an emphasis analysis process, a content analysis process, or the like. In some embodiments, the first analysis process (step 215) on each of the one or more conceptual units to determine a respective first score for each conceptual unit. In some embodiments, the first analysis process is a sentiment analysis process, and the first score is a sentiment score. A sentiment analysis process, as used herein, is a process usable to determine or identify the connotation, attitude, or judgement for a word based on the textual usage of that word and other surrounding words.

In some embodiments, a sentiment score is a quantitative assessment of the sentiment of a word. For example, in some embodiments, a lower value for the sentiment score is associated with a more negative assessment, and a higher value with a more positive assessment. In some embodiments, the sentiment score is a qualitative indicator that separates sentiment into categories, such as 1 for positive, 0 for neutral, and −1 for negative. In some embodiments, the sentiment score includes qualitative and quantitative aspects.

In some embodiments, the sentiment analysis process includes determining sentiment data for the one or more conceptual units, and basing the sentiment score on the determined sentiment data. For a respective conceptual unit, sentiment data may include a repetition quantity of at least one word or phrase from the respective conceptual unit in the overall text. In other words, the repetition quantity is indicative of a number of times the at least one word or phrase is repeated amongst the one or more conceptual units. The sentiment data may include a connotation of the at least one word or phrase. In some embodiments, the machine learning model includes human speech data that has a database of predetermined connotations for words or phrases. In some embodiments, the recommendation system 120 is configured to access such a database on another system over the electronic network 115. In some embodiments, the recommendation system 120 and/or another system in communication with the recommendation system 120 may deploy a machine-learning technique configured to determine the connotation of a word or phrase. In some embodiments, sentiment data may include a value indicative of a quantity of adverbs, adjectives, or other parts of speech in the respective conceptual unit.

Any acceptable process is usable to determine the sentiment score based on the sentiment data. In some embodiments, point values are assigned to different aspects of the sentiment data. In some embodiments, the point values are normalized, and/or added via any acceptable process for aggregating scores such as via a logarithmic scale. In some embodiments, the recommendation system 120 deploys a machine learning technique, clustering technique, or other scoring processes.

Table 2 below illustrates an example of sentiment scores applied to each conceptual unit included in Table 1. It should be understood that the scoring is an example only, and that any acceptable methodology for scoring may be applied.

TABLE 2

Example of Sentiment Score Determination

| Conceptual Unit | Scoring Applied | Score |
| --- | --- | --- |
| 1-"I want a red" | "want" - connotation +1 | 1 |
| 2-"car" | "car" - connotation 0 "neutral" | 0 |
| 3-"with a fast engine" | "fast" - connotation +1; adjective +1 | 2 |
| 4-"It has to be red" | "has to be" - connotation +3 "red" - repetition +1 | 4 |
| 5-"Like . . . fire engine red!" | "fire engine" - adjective +1 "red" - repetition +1 | 2 |

The recommendation system 120 may perform the second analysis process (step 220) on the respective portion of the human speech in the audio data correlated with each of the conceptual units to determine a respective second score for each conceptual unit. In some embodiments, the second analysis process is an emphasis analysis process, and the second score is an emphasis score. As used herein, the term "emphasis" refers to audible qualities of human speech other than the actual words that are indicative of sentiment, importance, or other contextual aspects of the human speech. In some embodiments, the emphasis analysis process includes a maximum entropy modelling process.

In some embodiments, the emphasis analysis process determines at least one vocal aspect of the respective portion of the human speech from the audio data that is correlated with each of the one or more conceptual units. As used herein, a vocal aspect means an aspect of a speaker's voice that is indicative of the speaker's emphasis. For example, a vocal aspect may include one or more of a voice pitch, a speech speed, a change in voice pitch, a change in speech speed, or the like. Any acceptable process is usable to determine the at least one vocal aspect. In some embodiments, the determination of the emphasis score of the respective one of the conceptual units by the emphasis analysis process is based on the determination of the at least one vocal aspect. Any acceptable process for determining the emphasis score may be used. In some embodiments, the emphasis scores of the conceptual units may be normalized, or aggregated via any acceptable process for aggregating scores.

Table 3 is an example of emphasis scores determined for each conceptual unit from Table 1. It should be understood that the scoring is an example only, and that any acceptable methodology for scoring may be applied.

TABLE 3

Example of Emphasis Score Determination

| Conceptual Unit | Scoring Applied | Score |
|---|---|---|
| 1-"I want a red" - 0:01 to 0:02 | Pitch change +1 | 1 |
| 2-"car" - 0:02 to 0:02 | Consistent speech speed, set score equal to previous unit, +1 | 1 |
| 3-"with a fast engine" - :0:02 to 0:03 | Increased speech speed +1 | 1 |
| 4-"It has to be red" - 0:03 to 0:04 | Pitch change and speed decrease +2 | 2 |
| 5-"Like . . . fire engine red" - 0:04 to 0:06 | Pitch change, pause, and volume change +3 | 3 |

In step 225, the recommendation system 120 may apply the scoring process to each keyword that was associated with one or more of the conceptual units to determine a keyword score for that keyword. The keyword score for each such keyword is based on the respective first score and the respective second score of the one or more conceptual units associated with the keyword. In some embodiments, the keyword score for a keyword is also based on the number of conceptual units associated with that keyword. For instance, if a user mentions words associated with the keyword "red" relatively more often, relatively more conceptual units will be associated with that keyword, and the keyword score for that keyword will be relatively higher.

Any acceptable process for determining the keyword score may be used. In some embodiments, the keyword scores of the keywords may be normalized, or aggregated via any acceptable process for aggregating scores. In some embodiments, weights are applied to one or more of the first and second respective scores. In some embodiments, the respective first score and the respective second score of each conceptual unit are used to determine a respective score for the conceptual unit, and then the respective scores for all of the conceptual units associated with each keyword are used to determine the keyword score. In some embodiments, the recommendation system 120 may deploy machine learning techniques, such as linear regression, logistical regression, random forest, gradient boosted machine (GBM), and/or a deep neural network.

In some embodiments, keyword scores represent a ranking of the importance of the identified keywords to the user's product needs. In some embodiments, keyword scores are determined so that the values of the keyword scores do not repeat. In some embodiments, a higher keyword score is associated with a higher importance. In some embodiments, the keyword score is indicative of a rank of importance, such that a lower score has a higher importance. Any acceptable scoring methodology may be used.

Table 4 is an example of keyword scores determined for the keywords listed in Table 1. It should be understood that the scoring is an example only, and that any acceptable methodology for scoring may be applied.

TABLE 4

Example of Search Keyword Data

| Keyword | Conceptual Unit(s) (Sentiment Score, Emphasis Score) | Keyword Score |
|---|---|---|
| red | 1-"I want a red" - 0:01 to 0:02 (1, 1) 4-"It has to be red" - 0:03 to 0:04 (4, 2) 5-"Like . . . fire engine red" - 0:04 to 0:06 (2, 3) | 8/10 |
| car | 2-"car" - 0:02 to 0:02 (0, 1) | 2/10 |
| High performance | 3-"with a fast engine" - :0:02 to 0:03 (2, 1) | 5/10 |

The generated keywords and keyword scores, such as the examples in Table 4 above, represent search parameters usable by the recommendation system 120 to perform a search query to find products that may meet the user's product needs. Because the generated search parameters are based on the first and second analysis processes, as discussed above, the search parameters account for the contextual information of the user's human speech beyond the mere text included in the speech.

In step 230, the recommendation system 120 may determine the at least one product recommendation based on the one or more keywords associated with the one or more conceptual units, and based on the corresponding keyword score for each such keyword. In other words, the recommendation system 120 performs a search query using the search parameters generated as discussed above. In some embodiments, the recommendation system 120 deploys the identified keywords as search parameters, and deploys the associated keyword scores as weights applied to the corresponding parameters. In some embodiments, the recommendation system 120 may use such search parameters and weights to generate a search query, and transmit such search query to a vendor system 110 or another system having an inventory database of available products. Any acceptable search technique may be used.

In some embodiments, the recommendation system 120 uses the identified keywords to generate a search query, and then uses the keyword scores to rank the results returned from the query. Such a process may enable to recommendation system 120 to interface with existing search engines that allow the use of keywords and parameters, but which do not account for sentiment or emphasis and are not configured to account for keyword scores.

In an example of a type of search that may be executed using the recommendation system, in some embodiments, available products are evaluated based on how well the parameters of the products align with the user's product needs. By virtue of the techniques discussed above, the user's product needs may be expressed in terms of keywords and associated keyword scores. Thus, an available product may be evaluated in terms of whether the product's parameters are in alignment with parameters associated with the identified keywords, whereby the keyword scores define weights associated with those parameters.

In other words, in some embodiments, each keyword of the predetermined list of keywords corresponds to a possible criterion for the product. The keywords associated with the one or more conceptual units correspond to a subset of the criteria that represent the user's product needs. Thus, an available product may be evaluated against such criteria to determine qualitatively how well that product aligns with the user's product needs. An alignment score of an available product is based on whether that product satisfies the criterion of the one or more keywords associated with the one or more conceptual units and the corresponding keyword score. The at least one product recommendation, therefore, may be determined based on the alignment scores of one or more available products.

For example, consider a vehicle that is a blue car with a fast engine. The vehicle may be scored via the example below to determine an alignment score of −1.

TABLE 5

Example of Scoring Available Product

| Keyword | Keyword Score | Satisfied? | Effect on Alignment Score |
|---|---|---|---|
| red | 8/10 | NO | −8 |
| car | 2/10 | YES | +2 |
| High performance | 5/10 | YES | +5 |

Alignment Score=Sum of Effects=−8+2+5=−1

In the above example, dissatisfaction of a criteria was associated with a negative impact on the alignment score. In some embodiments, only satisfactions of criteria are considered. It should be understood that the scoring above is an example only, and that any acceptable methodology for scoring may be applied. In some embodiments, the recommendation system 120 determines a ranking for search results from an automated search based on alignment scores determined for the results.

In some embodiments, the recommendation system 120 may determine the at least one product recommendation based on whether the alignment score of a particular product is above a predetermined threshold, based on a highest alignment score from the considered products, or both. In some embodiments, the at least one recommendation includes a plurality of product recommendations ranked in order of respective alignment score. In some embodiments, the recommendation system 120 assigns weights to one or more keywords, and determines one or more different recommendations corresponding to each weighted keyword.

In step 235, the recommendation system 120 may cause the user system 105 to output one or more of the products returned by the search query. In some embodiments, the recommendation system 120 causes the user system 105 to output a ranked list of products, whereby the ranking is based on the generated search parameters, the alignment scores, or both. In some embodiments, the recommendation system 120 selects a particular product from the search results to be output based on the generated search parameters, the alignment scores, or both. For instance, the recommendation system 120 may select a product from the search results determined to be an optimal fit to the user's product needs.

Figure 4:
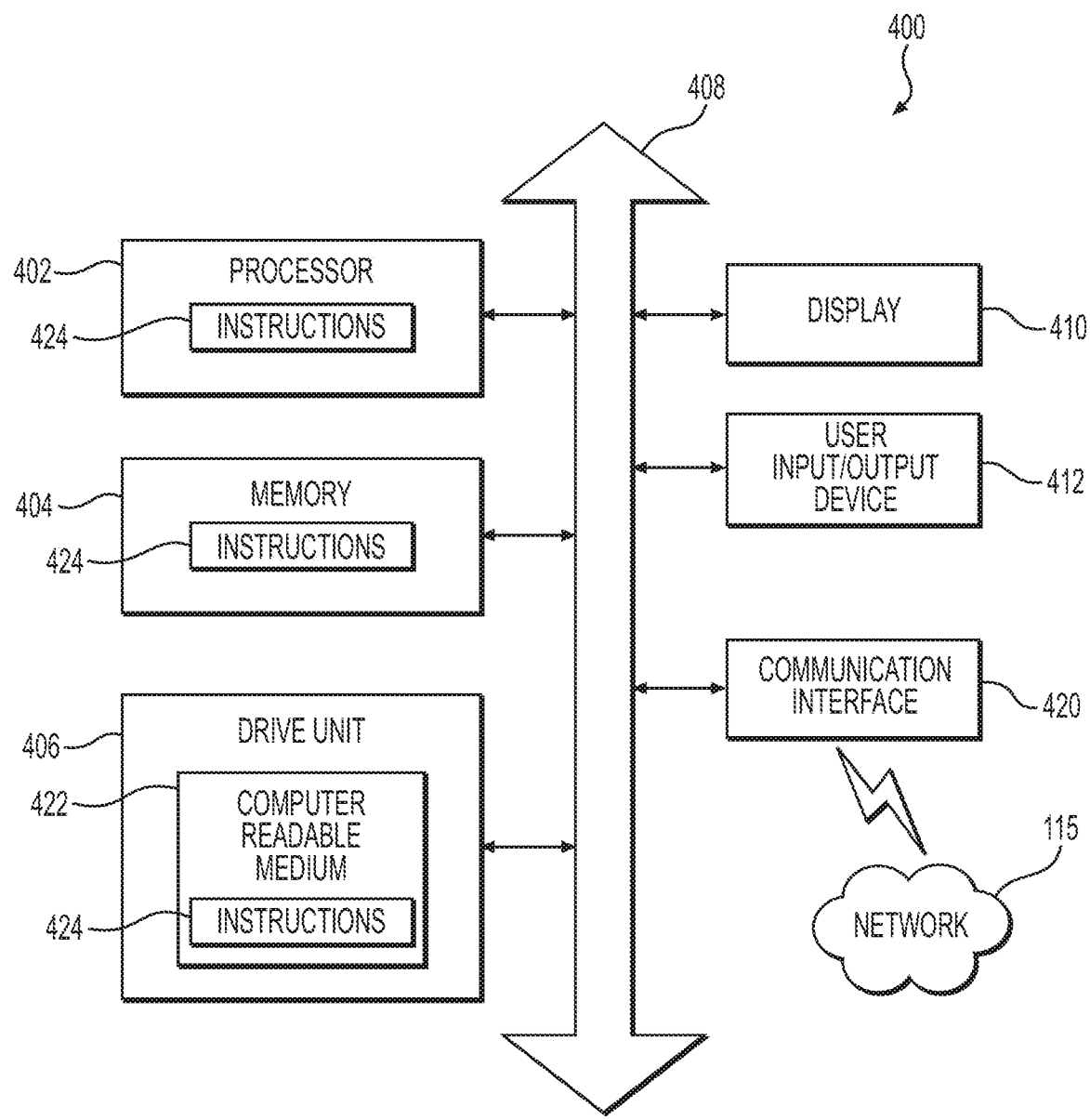
FIG. 4 depicts an example of a computing device, according to aspects of the present disclosure.

FIG. 4 is a simplified functional block diagram of a computer 400 that may be configured as a device for executing the methods of FIGS. 2-3, according to exemplary embodiments of the present disclosure. FIG. 4 is a simplified functional block diagram of a computer that may be configured to determine contextual information of human speech and generate product recommendations based on the contextual information according to exemplary embodiments of the present disclosure. Specifically, in one embodiment, any of the user devices/systems, servers, etc., discussed herein may be an assembly of hardware including, for example, a data communication interface 420 for packet data communication. The platform also may include a central processing unit ("CPU") 402, in the form of one or more processors, for executing program instructions. The platform may include an internal communication bus 408, and a storage unit/drive unit 406 (such as ROM, HDD, SDD, etc.) that may store data on a computer readable medium 422, although the computer 400 may receive programming and data via network communications (e.g., via communication interface 420). The computer 400 may also have a memory 404 (such as RAM) storing instructions 424 for executing techniques presented herein, although the instructions 424 may be stored temporarily or permanently within other modules of computer 400 (e.g., processor 402 and/or computer readable medium 422). The computer 400 also may include input and output ports 412 and/or a display 410 to connect with input and output devices such as keyboards, mice, touchscreens, monitors, displays, etc. The various system functions may be implemented in a distributed fashion on a number of similar platforms, to distribute the processing load. Alternatively, the systems may be implemented by appropriate programming of one computer hardware platform.

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

While the presently disclosed methods, devices, and systems are described with exemplary reference to transmitting data, it should be appreciated that the presently disclosed embodiments may be applicable to any environment, such as a desktop or laptop computer, an automobile entertainment system, a home entertainment system, etc. Also, the presently disclosed embodiments may be applicable to any type of Internet protocol.

Other embodiments of the disclosure will be apparent to those skilled in the art from consideration of the specification and practice of the disclosure disclosed herein. It is intended that the specification and examples be considered as exemplary only, with a true scope and spirit of the disclosure being indicated by the following claims.

In general, any process discussed in this disclosure that is understood to be performable by a computer may be performed by one or more processors. Such processes include, but are not limited to: the processes shown in FIGS. 2-3, and the associated language of the specification. The one or more processors may be configured to perform such processes by having access to instructions (computer-readable code) that, when executed by the one or more processors, cause the one or more processors to perform the processes. The one or more processors may be part of a computer system (e.g., one of the computer systems discussed above) that further includes a memory storing the instructions. The instructions also may be stored on a non-transitory computer-readable medium. The non-transitory computer-readable medium may be separate from any processor. Examples of non-transitory computer-readable media include solid-state memories, optical media, and magnetic media.

It should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Thus, while certain embodiments have been described, those skilled in the art will recognize that other and further modifications may be made thereto without departing from the spirit of the invention, and it is intended to claim all such changes and modifications as falling within the scope of the invention. For example, functionality may be added or deleted from the block diagrams and operations may be interchanged among functional blocks. Steps may be added or deleted to methods described within the scope of the present invention.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations and implementations are possible within the scope of the disclosure. Accordingly, the disclosure is not to be restricted except in light of the attached claims and their equivalents.

What is claimed is:

1. A computer-implemented method, comprising:
receiving audio data from a user device, the audio data including human speech from a user associated with the user device;
performing a speech-to-text process on the received audio data to determine text corresponding to, and correlated with, the human speech in the received audio data;
segmenting the text into one or more discrete conceptual units, such that a respective portion of the human speech is correlated with each of the one or more conceptual units;
identifying one or more keywords in a predetermined list of keywords that correspond to one or more words in the text, and associating each identified keyword with one or more of the conceptual units having the corresponding one or more words;
performing a first analysis process on each of the one or more conceptual units to determine a respective first score of each of the one or more conceptual units, wherein the first analysis process is a sentiment analysis process, and the first score is a sentiment score;
performing a second analysis process on the respective portion of the human speech correlated with each of the one or more conceptual units to determine a respective second score of each of the one or more conceptual units, wherein the second analysis process is an emphasis analysis process, and the second score is an emphasis score that is indicative of an importance of a corresponding conceptual unit to the user;
for each keyword in the predetermined list of keywords that is associated with one or more of the one or more conceptual units, determining a keyword score based on the respective first score and the respective second score of the one or more conceptual units, the keyword score defining a relative importance of the keyword compared to other keywords in the predetermined list of keywords that is associated with one or more of the one or more conceptual units;
determining at least one product recommendation based on the one or more keywords associated with one or more of the one or more conceptual units and the corresponding keyword score; and
causing the user device to output the at least one product recommendation.

2. The computer-implemented method of claim 1, further comprising, prior to receiving the audio data:
causing the user device associated with the user to output a prompt for a description of the product.

3. The computer-implemented method of claim 1, wherein:
the sentiment analysis process determines sentiment data of a respective one of the one or more conceptual units, the sentiment data including one or more of:
 a repetition quantity of at least one word or phrase from the respective one of the one or more conceptual units that is indicative of a number of times the at least one word or phrase is repeated in the one or more conceptual units;
 a connotation of the at least one word or phrase in the respective one of the one or more conceptual units; or
 a quantity of adverbs in the respective one of the one or more conceptual units; and
the sentiment score of at least one keyword associated with the respective one of the one or more conceptual units is based upon the determined sentiment data.

4. The computer-implemented method of claim 1, wherein the segmenting of the text into the one or more discrete conceptual units is based on one or more of parts of speech in the text or pauses between portions of the human speech in the audio data.

5. The computer-implemented method of claim 1, wherein the emphasis analysis process includes a maximum entropy modeling process.

6. The computer-implemented method of claim 1, wherein:
the emphasis analysis process determines at least one vocal aspect of the respective portion of the human speech correlated with a respective one of the one or more conceptual units;
the at least one vocal aspect includes one or more of a voice pitch, a speech speed, a change in voice pitch, or a change in voice speed in the respective portion of the human speech; and
the determination of the emphasis score of the respective one of the one or more conceptual units by the emphasis analysis process is based on the determination of the at least one vocal aspect.

7. The computer-implemented method of claim 1, wherein:
each keyword of the predetermined list of keywords corresponds to a criterion for the product; and
the at least one product recommendation is determined based on an alignment score of one or more available products, each alignment score based on whether a respective product satisfies the criterion of the one or more keywords associated with one or more of the one or more conceptual units and the corresponding keyword score.

8. The computer-implemented method of claim 7, wherein:
the at least one product recommendation is determined based on alignment scores of multiple products; and
the method further comprises:
ranking the multiple products based on the alignment scores of the multiple products; and
causing the user device to output the ranking of the multiple products.

9. A computer-implemented method, comprising:
generating search keyword data for a search related to a product, by:
causing a user device associated with a user to output at least one prompt for a description of a product, wherein each of the at least one prompt is associated with a respective category of keywords in a predetermined list of keywords associated with the product;
receiving audio data from the user device, the audio data including human speech from the user;
performing a speech-to-text process on the received audio data to determine text corresponding to, and correlated with, the human speech in the received audio data;
segmenting the text into one or more discrete conceptual units, such that a respective portion of the human speech is correlated with each of the one or more conceptual units; and
identifying one or more keywords in the predetermined list of keywords that correspond to one or more words in the text, and associating each identified keyword with one or more of the conceptual units having the corresponding one or more words;
determining, based on the identifying, for each category of keywords, whether the category of keywords consists of keywords unassociated with any of the conceptual units and, in response to the determining, repeating the generating of search keyword data using at least one prompt associated with the category of keywords consisting of keywords unassociated with any of the conceptual units;
performing a first analysis process on each of the one or more conceptual units to determine a respective first score of each of the one or more conceptual units, wherein the first analysis process is a sentiment analysis process, and the first score is a sentiment score;
performing a second analysis process on the respective portion of the human speech correlated with each of the one or more conceptual units to determine a respective second score of each of the one or more conceptual units, wherein the second analysis process is an emphasis analysis process, and the second score is an emphasis score, and the second score is an emphasis score that is indicative of an importance of a corresponding conceptual unit to the user;
for each keyword in the predetermined list of keywords that is associated with one or more of the one or more conceptual units, determining a keyword score based on the respective first score and the respective second score of the one or more conceptual units, the keyword score defining a relative importance of the keyword compared to other keywords in the predetermined list of keywords that is associated with one or more of the one or more conceptual units;
determining at least one product recommendation based on the one or more keywords associated with one or more of the one or more conceptual units and the corresponding keyword score; and
causing the user device to output the at least one product recommendation.

10. The computer-implemented method of claim 9, wherein:
the sentiment analysis process determines sentiment data of a respective one of the one or more conceptual units, the sentiment data including one or more of:
a repetition quantity of at least one word or phrase from the respective one of the one or more conceptual units that is indicative of a number of times the at least one word or phrase is repeated in the one or more conceptual units;
a connotation of the at least one word or phrase in the respective one of the one or more conceptual units; or
a quantity of adverbs in the respective one of the one or more conceptual units; and
the sentiment score of at least one keyword associated with the respective one of the one or more conceptual units is based upon the determined sentiment data.

11. The computer-implemented method of claim 9, wherein the segmenting of the text into the one or more discrete conceptual units is based on one or more of parts of speech in the text or pauses between portions of the human speech in the audio data.

12. The computer-implemented method of claim 9, wherein the emphasis analysis process includes a maximum entropy modeling process.

13. The computer-implemented method of claim 9, wherein:
the emphasis analysis process determines at least one vocal aspect of the respective portion of the human speech correlated with a respective one of the one or more conceptual units;
the at least one vocal aspect includes one or more of a voice pitch, a speech speed, a change in voice pitch, or a change in voice speed in the respective portion of the human speech; and
the determination of the emphasis score of the respective one of the one or more conceptual units by the emphasis analysis process is based on the determination of the at least one vocal aspect.

14. The computer-implemented method of claim 9, wherein:
each keyword of the predetermined list of keywords corresponds to a criterion for the product; and
the at least one product recommendation is determined based on an alignment score of one or more available products, each alignment score based on whether a respective product satisfies the criterion of the one or more keywords associated with one or more of the one or more conceptual units and the corresponding keyword score.

15. The computer-implemented method of claim 14, wherein:
the at least one product recommendation is determined based on alignment scores of multiple products; and
the method further comprises:
ranking the multiple products based on the alignment scores of the multiple products; and
causing the user device to output the ranking of the multiple products.

16. A system comprising:
a memory storing instructions; and
at least one processor executing the instructions to perform a process including:
causing a user device associated with a user to output a prompt for a description of a product;
receiving audio data from the user device, the audio data including human speech from the user;
performing a speech-to-text process on the received audio data to determine text corresponding to, and correlated with, the human speech in the received audio data;
segmenting the text into one or more discrete conceptual units, such that a respective portion of the human speech is correlated with each of the one or more conceptual units;
identifying, from a predetermined list of keywords associated with the product, keywords that correspond to one or more words in the one or more conceptual units, and associating the identified keywords with the one or more conceptual units having the corresponding words;
performing a sentiment analysis process on each of the one or more conceptual units to determine a respective sentiment score of each of the one or more conceptual units;
performing an emphasis analysis process on the respective portion of the human speech correlated with each of the one or more conceptual units to determine a respective emphasis score of each of the one or more conceptual units, the emphasis score indicative of an importance of a corresponding conceptual unit to the user;
for each keyword in the predetermined list of keywords that is associated with one or more of the one or more conceptual units, determining a keyword score based on the respective sentiment score and the respective emphasis score of the one or more conceptual units, the keyword score defining a relative importance of the keyword compared to other keywords in the predetermined list of keywords that is associated with one or more of the one or more conceptual units;
determining at least one product recommendation based on the one or more keywords associated with one or more of the one or more conceptual units and the corresponding keyword score; and
causing the user device to output the at least one product recommendation.

* * * * *